US 12,158,863 B2

United States Patent
Ohashi et al.

(10) Patent No.: US 12,158,863 B2
(45) Date of Patent: *Dec. 3, 2024

(54) RIGHT HOLDER TERMINAL, USER TERMINAL, AND NON-TRANSITORY COMPUTER-READABLE MEDIUM

(71) Applicant: Nippon Telegraph and Telephone Corporation, Tokyo (JP)

(72) Inventors: Shigenori Ohashi, Musashino (JP); Hiroki Watanabe, Musashino (JP); Tatsuro Ishida, Musashino (JP); Shigeru Fujimura, Musashino (JP); Atsushi Nakadaira, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/382,986

(22) Filed: Oct. 23, 2023

(65) Prior Publication Data

US 2024/0104065 A1 Mar. 28, 2024

Related U.S. Application Data

(62) Division of application No. 17/434,607, filed as application No. PCT/JP2020/007053 on Feb. 21, 2020, now Pat. No. 11,868,322.

(30) Foreign Application Priority Data

Mar. 6, 2019 (JP) .................. 2019-040469

(51) Int. Cl.
*G06F 16/18* (2019.01)
*G06F 16/11* (2019.01)
*G06F 16/182* (2019.01)

(52) U.S. Cl.
CPC ........ *G06F 16/1837* (2019.01); *G06F 16/122* (2019.01); *G06F 16/1865* (2019.01)

(58) Field of Classification Search
CPC ... G06F 16/1837; G06F 16/122; G06F 16/186
(Continued)

(56) References Cited

U.S. PATENT DOCUMENTS

| 11,868,322 | B2 | 1/2024 | Ohashi et al. |
| 2020/0118124 | A1* | 4/2020 | Menon ................. G06Q 20/409 |
| 2022/0171743 | A1 | 6/2022 | Ohashi et al. |

FOREIGN PATENT DOCUMENTS

| WO | WO 2019133310 | 7/2019 |
| WO | WO-2019133310 A1 * | 7/2019 ............. G06F 21/10 |

OTHER PUBLICATIONS

Benet, "IPFS—Content Addressed, Versioned, P2P File System (Draft 3)," available on or before Mar. 26, 2014, retrieved on Aug. 27, 2021, retrieved from URL <raw.githubusercontent.com>, 11 pages.

(Continued)

*Primary Examiner* — Glenford J Madamba
(74) *Attorney, Agent, or Firm* — Fish & Richardson P.C.

(57) ABSTRACT

Pieces of information on multiple file management systems are managed by one contract in a distributed ledger. An administrator terminal includes: a file management system generation unit that issues a contract generation transaction for generating, in blockchain data, a contract in which a network identifier that identifies a file management system is associated with an identifier of a participant terminal in a blockchain system, and notifying the participant terminal of the network identifier and an identifier of the contract; and a file management control unit that issues a registration transaction for registering, in the contract, connection information of the administrator terminal in the file management system, acquires connection information of the participant (Continued)

terminal in the file management system from the contract, and establishes a P2P connection with the participant terminal based on the acquired connection information.

5 Claims, 10 Drawing Sheets

(58) Field of Classification Search
 USPC .......................................................... 709/204
 See application file for complete search history.

(56) References Cited

OTHER PUBLICATIONS

Steichen et al., "Blockchain-Based, Decentralized Access Control for IPFS," IEEE International Conference on Blockchain, Jul. 2018, 9 pages.

* cited by examiner

Fig. 5

| NETWORK ID | CONTRACT ID | COMMON KEY | CONNECTION INFORMATION | OTHER PARTICIPANT CONNECTION INFORMATION |
|---|---|---|---|---|
| 0xyer2.. | ... | ... | ... | ... |
| ... | ... | ... | ... | ... |

C FILE MANAGEMENT CONTROL DATA

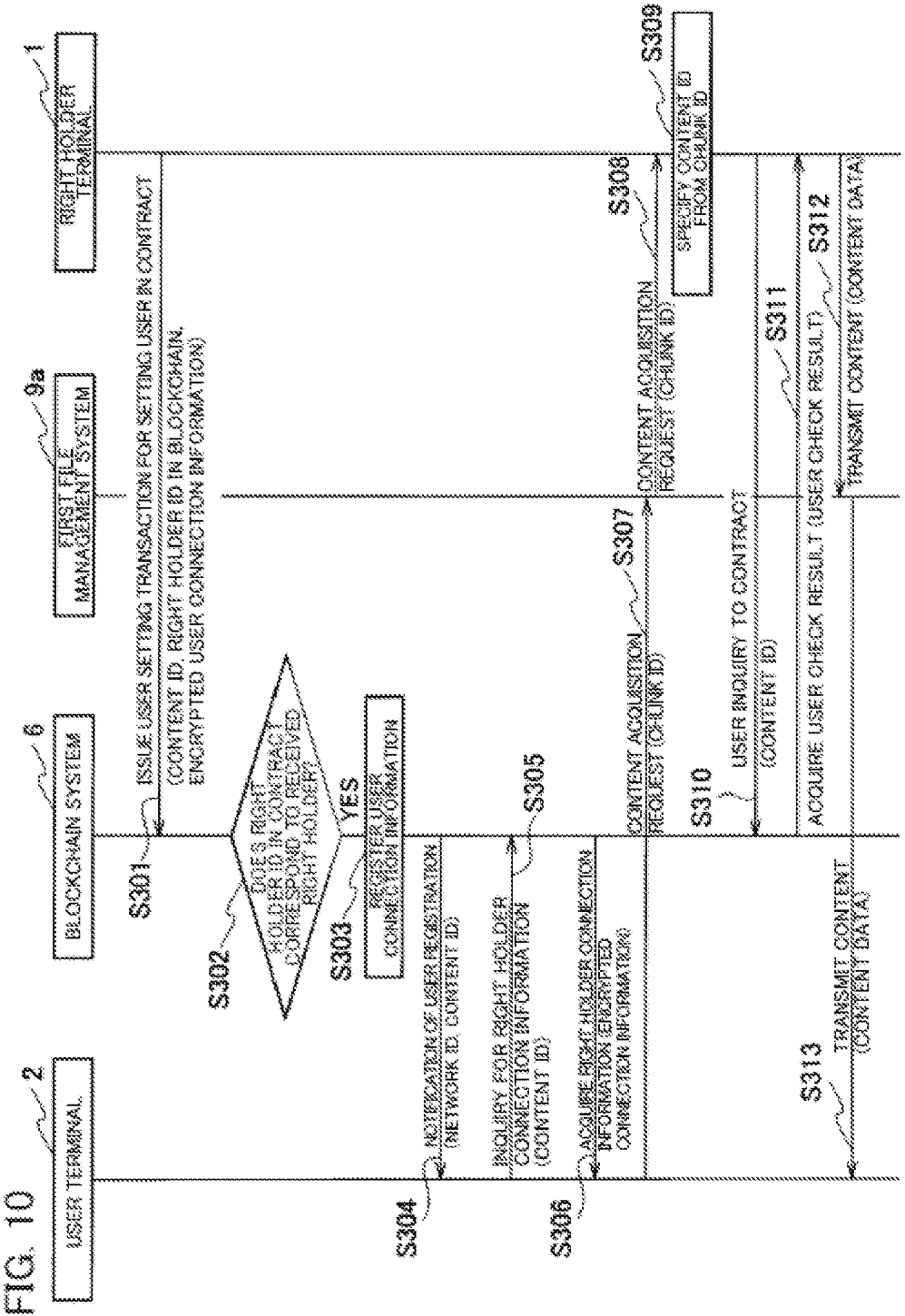

RIGHT HOLDER TERMINAL, USER TERMINAL, AND NON-TRANSITORY COMPUTER-READABLE MEDIUM

CROSS-REFERENCE TO RELATED APPLICATIONS

This application is a divisional application of U.S. application Ser. No. 17/434,607, having a Filing Date of Aug. 27, 2021, which is a National Stage application under 35 U.S.C. § 371 of International Application No. PCT/JP2020/007053, having an International Filing Date of Feb. 21, 2020, which claims priority to Japanese Application Serial No. 2019-040469, filed on Mar. 6, 2019. The disclosure of the prior applications is considered part of the disclosure of this application, and are incorporated in their entirety into this application.

TECHNICAL FIELD

The present invention relates to a right holder terminal, a user terminal and a non-transitory computer-readable medium for use in a content use system that includes a file management system managed by an administrator and a distributed ledger system having a distributed ledger.

BACKGROUND ART

Blockchain which is one type of a decentralized distributed ledger is used for transactions of digital cryptocurrencies. In the blockchain, pieces of information on transactions of cryptocurrencies communicated among participants are collected in units of blocks to form the blockchain. Regarding a structure of the blockchain, as the term chain implies, the blockchain is recorded in such a way that each block is linked to an immediately preceding block. Specifically, each block is linked one another by including a hash value of the immediately preceding block in each block.

Accordingly, if transaction information included in a block at a certain point in time is to be falsified, it is necessary to falsify all blocks at and after the falsified block because a hash value of the falsified block changes. When a block is to be added, it is necessary to perform a very computationally intensive process (mining) to find additional information (a nonce) such that the hash value of the added block meets certain conditions, and therefore, the blockchain is formed using a mechanism that is very robust against the falsification.

Also, a programmable blockchain has been proposed in Ethereum. Program code which is also called a contract is registered in the blockchain in advance. If a transaction that designates contract execution is input, the program code is executed if the transaction is included in a block. The execution result is stored in state data of the blockchain.

IPFS (InterPlanetary File System) is an example of a distributed file management system (file management system) that does not presume privileged nodes (see Non Patent Literature 1). In IPFS, a file is divided into chunks of a certain size and managed by terminals that belong to the IPFS. A file is recognized by an identifier generated from a hash value, and the falsification of the file is not possible. IPFS can ensure the transparency and reliability by its dispersibility and an ID structure.

Also, in view of the fact that the blockchain has a mechanism that is very robust against the falsifications of the blockchain, there is a system that integrates a file management system and a blockchain (see Non Patent Literature 2). In Non Patent Literature 2, a file is divided into chunks. Each chunk is organized in a DAG (Directed Acyclic Graph), and each chunk contains information on a chunk of a link destination. In Non Patent Literature 2, identifiers of all of the chunks that form DAG are individually registered in the blockchain.

CITATION LIST

Non Patent Literature

[Non Patent Literature 1] Juan Ballet, "IPFS-Content Addressed, Versioned, P2P File System (DRAFT 3)", [Online], [Retrieved on Oct. 30, 2018], Internet <URL: https://ipfs.io/ipfs/QmR7GSQM93Cx5eAg6a6yRzNd elFQv7uL6X1o4k7zrJa3LX/ipfs.draft3.pdf>.

[Non Patent Literature 2] Mathis Steichen, et al., "Blockchain-Based, Decentralized Access Control for IPFS", [Online], [Retrieved on Oct. 15, 2018], Internet <URL: https://www.researchgate.net/publication/327034734_Blockchain-Based_Decentralized_Access_Control_for_IPFS>.

SUMMARY OF THE INVENTION

Technical Problem

In Non Patent Literature 2, one file management system corresponds to one contract of the blockchain, and files of the file management system are managed by one contract of the blockchain. However, in general, in order to prevent the sharing of a file with a third party, the file management system is often operated separately for each operating process.

In Non Patent Literature 2, if an attempt is made to link one contract with multiple file management systems, pieces of information on multiple operating processes will be mixed in one contract. As a result, it may not be possible to ensure the confidentiality between the operating processes. Also, the leakage of an address of an administrator of the contract may affect each file management system and operating process.

In view of this, the expectation is made for the development of a mechanism according to which information of multiple file management systems can be managed by a single contract that corresponds to the file management systems in the distributed ledger.

Accordingly, an object of the present invention is to provide a right holder terminal, a user terminal and a non-transitory computer-readable medium that enable information of a plurality of file management systems to be managed by a single contract that corresponds to the file management systems in a distributed ledger.

Means for Solving the Problem

In order to solve the above problems, a first feature of the present invention relates to an administrator terminal used for a content use system that includes a file management system managed by an administrator, a distributed ledger system including a distributed ledger, the administrator terminal used by the administrator, and a participant terminal used by a participant who participates in the file management system. The administrator terminal according to the first feature of the present invention includes a file management system generation unit that issues a contract generation transaction for generating, in the distributed ledger, a contract in which a network identifier that identifies the file management system is associated with an identifier of the participant terminal in the distributed ledger system, and notifying the participant terminal of the network identifier and an identifier of the contract, and a file management control unit that issues a registration transaction for registering, in the contract, connection information of the administrator terminal in the file management system, acquires connection information of the participant terminal in the file management system from the contract, and establishes a P2P connection with the participant terminal based on the acquired connection information.

A second feature of the present invention relates to a participant terminal used for a content use system that includes a file management system managed by an administrator, a distributed ledger system including a distributed ledger, an administrator terminal used by the administrator, and the participant terminal used by a participant who participates in the file management system. The participant terminal according to the second feature of the present invention includes a file management control unit that, in response to being notified by the distributed ledger system of an identifier of a contract that corresponds to a network identifier that identifies the file management system, issues a registration transaction for registering, in the contract that corresponds to the notified contract identifier, connection information of the participant terminal in the file management system, acquires connection information of the administrator terminal from the contract that corresponds to the notified contract identifier, and establishes a P2P connection with the administrator terminal based on the acquired connection information.

A third feature of the present invention relates to a right holder terminal used for a content use system that includes a file management system, a distributed ledger system having a distributed ledger, and the right holder terminal used by a right holder of a content piece. The right holder terminal according to the third feature of the present invention includes a storage device for storing file management control data in which a network identifier that identifies the file management system is associated with an identifier of a contract that is held in the distributed ledger system and corresponds to the network identifier, a registration unit that issues a right holder registration transaction for registering the network identifier of the file management system in which a content piece is to be registered, an identifier of the content piece in the file management system, and connection information of the right holder terminal in the file management system, in the contract that corresponds to the network identifier, and a file management control unit that gives a notification that the right holder terminal has the content piece via the file management system.

A fourth feature of the present invention relates to a user terminal used for in a content use system that includes a file management system, a distributed ledger system having a distributed ledger, a right holder terminal used by a right holder of a content piece, and the user terminal used by a user of the content piece. The user terminal according to the fourth feature of the present invention includes a storage device that stores file management control data in which a network identifier that identifies the file management system is associated with an identifier of a contract that is held in the distributed ledger system and corresponds to the network identifier, and a file management control unit that holds routing data that is to be held by the user terminal in response to being notified that the right holder terminal has the content piece via the file management system.

A fifth feature of the present invention relates to a right holder terminal used for in a content use system that includes a file management system, a distributed ledger system including a distributed ledger, the right holder terminal used by a right holder of a content piece, and a user terminal used by a user of the content piece. The right holder terminal according to the fifth feature of the present invention includes a storage device that stores file management control data in which a network identifier that identifies the file management system is associated with an identifier of a contract that is held in the distributed ledger system and corresponds to the network identifier, a user registration unit that issues a user setting transaction for associating, in the contract that corresponds to the network identifier of the file management system that manages the content piece, an identifier of the content piece with connection information of the user terminal that is to use the content piece in the file management system, and a file management control unit that, in response to receiving an acquisition request for acquisition of the content piece from the user terminal via the file management system, transmits the content piece to the user terminal via the file management system if connection information of the user terminal is associated with the identifier of the content piece in the contract.

A sixth feature of the present invention relates to a user terminal used for in a content use system that includes a file management system, a distributed ledger system including a distributed ledger, a right holder terminal used by a right holder of a content piece, and the user terminal used by a user of the content piece, and the user terminal includes a storage device that stores file management control data in which a network identifier that identifies the file management system is associated with an identifier of a contract that is held in the distributed ledger system and corresponds to the network identifier, and a file management control unit that acquires connection information of the right holder terminal from the contract that corresponds to the network identifier of the file management system that manages the content piece, and requests the content piece from the right holder terminal via the file management system.

A seventh feature of the present invention relates to a content use system that includes a file management system managed by an administrator, a distributed ledger system including a distributed ledger, an administrator terminal used by the administrator, and a participant terminal used by a participant who participates in the file management system. In the content use system according to the seventh feature of the present invention, the administrator terminal includes a file management system generation unit that issues a contract generation transaction for generating, in the distributed ledger, a contract in which a network identifier that identifies the file management system is associated with an identifier of the participant terminal in the distributed ledger system, and notifying the participant terminal of the network identifier and an identifier of the contract, and a file management control unit that issues a registration transaction for registering, in the contract, connection information of the administrator terminal in the file management system, acquires connection information of the participant terminal in the file management system from the contract, and establishes a P2P connection with the participant terminal based on the acquired connection information, and the participant terminal includes a file management control unit that, in response to being notified by the distributed ledger system of the identifier of the contract that corresponds to the network identifier that identifies the file management system, issues a registration transaction for registering, in the contract that corresponds to the notified contract identifier, connection information of the participant terminal in the file management system, acquires connection information of the administrator terminal from the contract that corresponds to the notified contract identifier, and establishes a P2P connection with the administrator terminal based on the acquired connection information.

An eighth feature of the present invention relates to a content use system that includes a file management system, a distributed ledger system including a distributed ledger, a right holder terminal used by a right holder of a content piece, and a user terminal used by a user of the content piece. In the content use system according to the eighth feature of the present invention, the right holder terminal includes a storage device that stores file management control data in which a network identifier that identifies the file management system is associated with an identifier of a contract that is held in the distributed ledger system and corresponds to the network identifier, a registration unit that issues a right holder registration transaction for registering the network identifier of the file management system in which a content piece is to be registered, an identifier of the content piece in the file management system, and connection information of the right holder terminal in the file management system, in the contract that corresponds to the network identifier, and a file management control unit that notifies that the right holder terminal has the content piece via the file management system, and the user terminal includes a storage device that stores the file management control data, and a file management control unit that holds routing data that is to be held by the user terminal in response to being notified that the right holder terminal has the content piece via the file management system.

A ninth feature of the present invention relates to a content use system that includes a file management system, a distributed ledger system including a distributed ledger, a right holder terminal used by a right holder of a content piece, and a user terminal used by a user of the content piece. In the content use system according to the ninth feature of the present invention, the right holder terminal includes a storage device that stores file management control data in which a network identifier that identifies the file management system is associated with an identifier of a contract that is held in the distributed ledger system and corresponds to the network identifier, a user registration unit that issues a user setting transaction for associating, in the contract that corresponds to the network identifier of the file management system that manages the content piece, an identifier of the content piece with connection information of the user terminal that is to use the content piece in the file management system, and a file management control unit that, in response to receiving an acquisition request for acquisition of the content piece via the file management system from the user terminal, transmits the content piece to the user terminal via the file management system if connection information of the user terminal is associated with the identifier of the content piece in the contract, and the user terminal includes a storage device that stores the file management control data, and a file management control unit that acquires connection information of the right holder terminal from the contract that corresponds to the network identifier of the file management system that manages the content piece, and requests the content piece from the right holder terminal via the file management system.

A tenth feature of the present invention relates to an administrator program for causing a computer to function as the administrator terminal according to the first feature of the present invention.

An eleventh feature of the present invention relates to a participant program for causing a computer to function as the participant terminal according to the second feature of the present invention.

A twelfth feature of the present invention relates to a right holder program for causing a computer to function as the right holder terminal according to the third or fifth feature of the present invention.

A thirteenth feature of the present invention relates to a user program for causing a computer to function as the user terminal according to the fourth or sixth feature of the present invention.

A fourteenth feature of the present invention relates to a data structure of state data used for in a content use system that includes a plurality of file management systems and a distributed ledger system including a distributed ledger that holds information on right holders of content pieces managed by the file management systems. The data structure of state data according to the fourteenth feature of the present invention is a data structure of state data that corresponds to a contract that corresponds to the file management systems, and that associates network identifiers that identify the file management systems, identifiers of content pieces managed by the file management systems that correspond to the network identifiers, and connection information of a right holder terminal used by a right holder of a content piece in the file management system, and the right holder terminal issues a right holder registration transaction for registering an identifier of the content piece in the file management system in which the content piece is to be registered and connection information of the right holder terminal in the file management system, in a contract that corresponds to the network identifier of the file management system.

Effects of the Invention

According to the present invention, it is possible to provide a right holder terminal, a user terminal and a non-transitory computer-readable medium that enable information of a plurality of file management systems to be managed by a single contract in a distributed ledger.

BRIEF DESCRIPTION OF DRAWINGS

FIG. 5 is a diagram illustrating a data structure of file management control data according to an embodiment of the present invention, and an example of data.

FIG. 10 is a sequence diagram illustrating user registration processing in an embodiment of the present invention.

DESCRIPTION OF EMBODIMENTS

Figure 1:
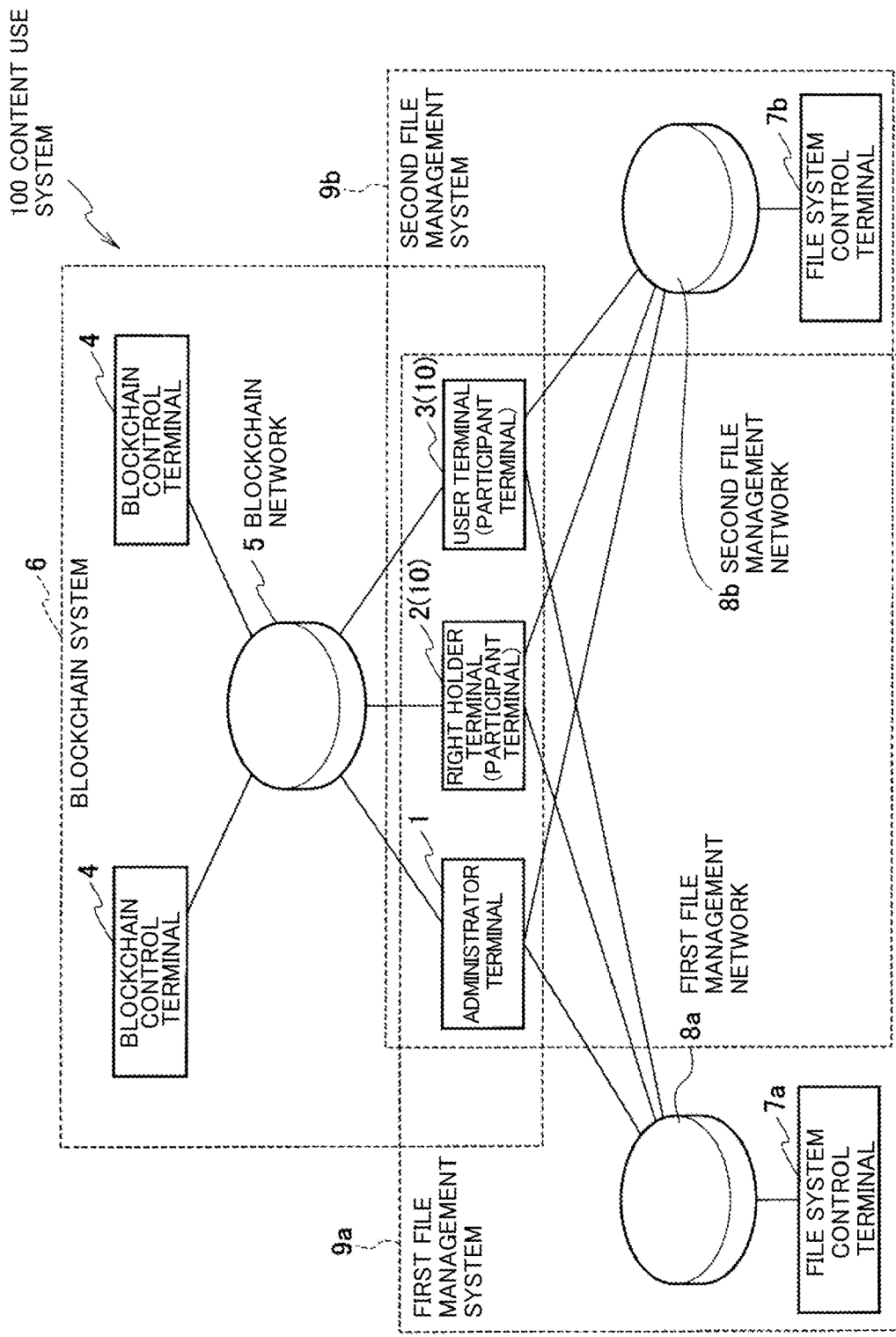
FIG. 1 is a diagram illustrating a system configuration of a content use system according to an embodiment of the present invention.

Next, an embodiment of the present invention will be described with reference to the drawings. In the descriptions of the drawings below, the identical or similar parts are denoted with identical or similar reference numerals.

Content use System

The following describes a content use system 100 in which an administrator terminal 1, a right holder terminal 2, and a user terminal 3 according to an embodiment of the present invention are used. The content use system 100 includes a blockchain system (a distributed ledger system) 6, a first file management system 9a, and a second file management system 9b.

The first file management system 9a and the second file management system 9b may be simply referred to as the file management system 9 when they do not need to be particularly distinguish in this embodiment of the present invention. Although the content use system 100 shown in FIG. 1 includes two file management systems 9, the number may be any number as long as the number is two or more.

Figure 2:
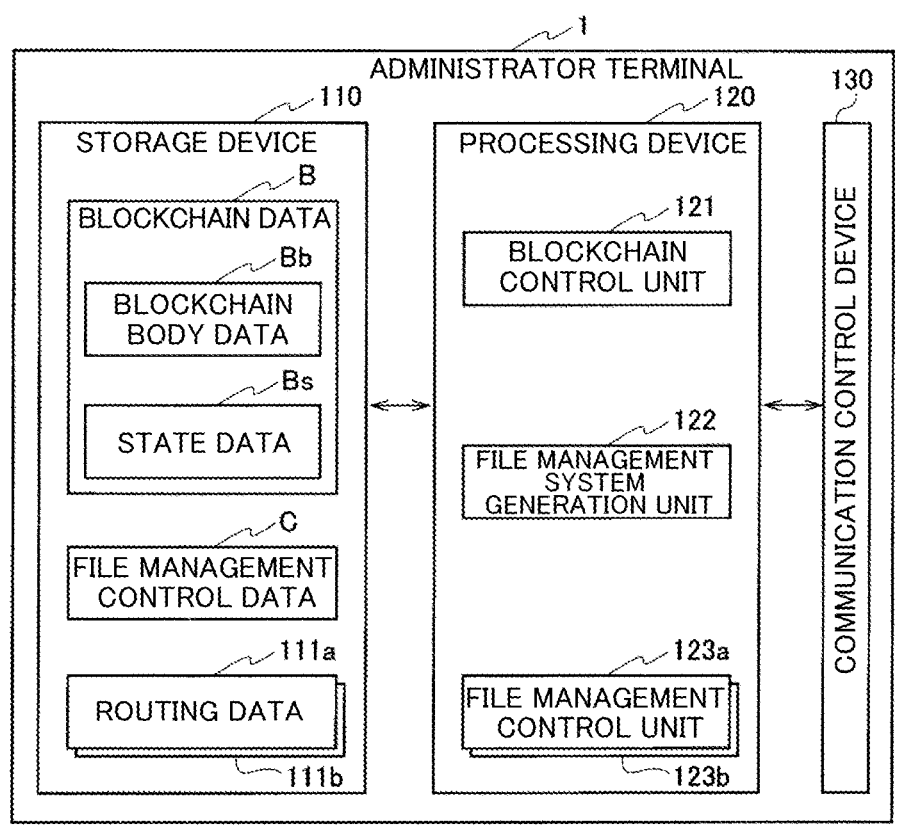
FIG. 2 is a diagram illustrating a hardware configuration and function blocks of an administrator terminal according to an embodiment of the present invention.
Figure 6:
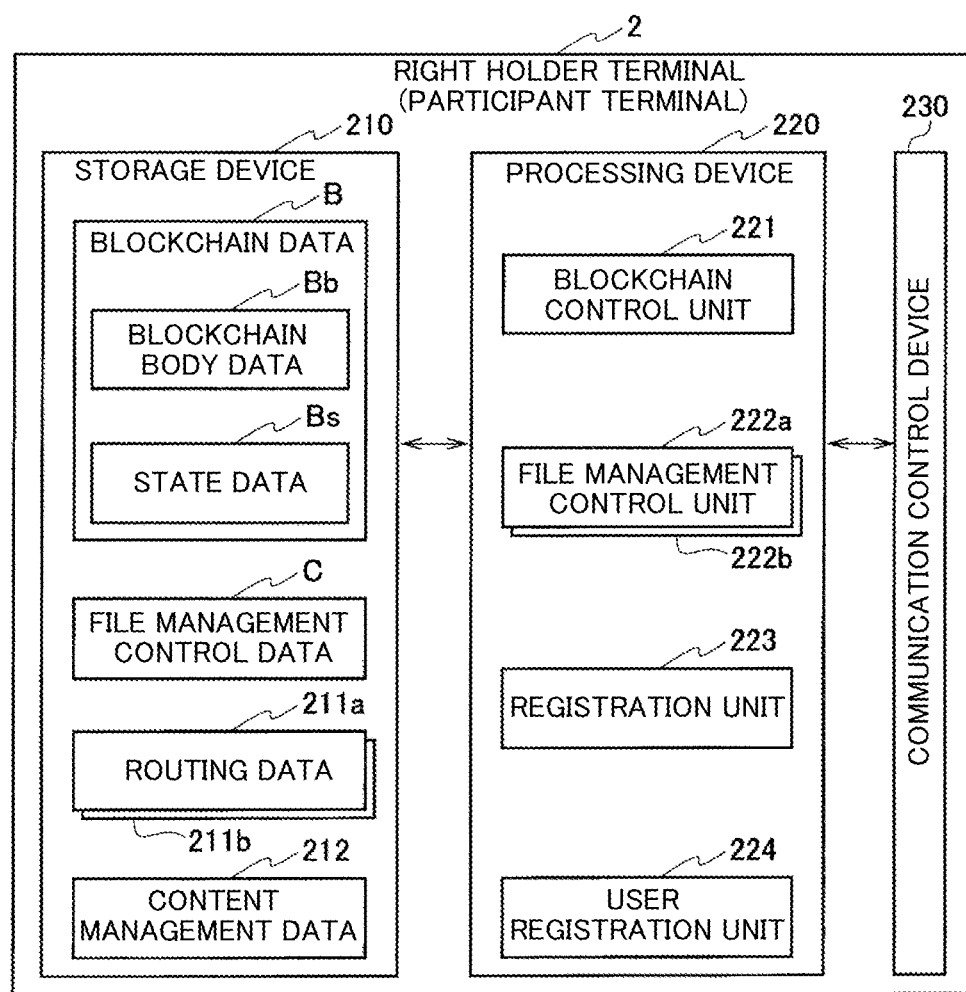
FIG. 6 is a diagram illustrating a hardware configuration and function blocks of a right holder terminal according to an embodiment of the present invention.
Figure 7:
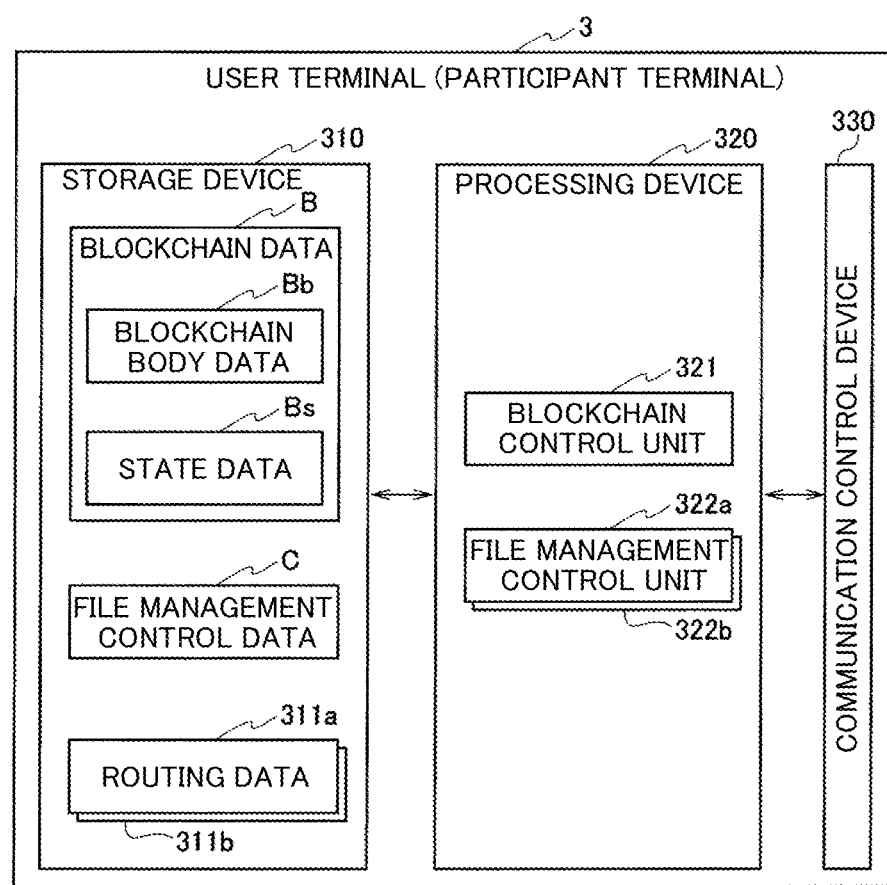
FIG. 7 is a diagram illustrating a hardware configuration and function blocks of a user terminal according to an embodiment of the present invention.

In the blockchain system 6, blockchain data (distributed ledger) B is shared between terminals that belong to the system. The blockchain data B is data formed by connected blocks that include transactions issued by terminals that belong to the system. The blockchain system 6 includes the administrator terminal 1, the right holder terminal 2, and the user terminal 3, and may include a plurality of blockchain control terminals 4. Each of the terminals that belongs to the blockchain system 6 establishes a P2P (Peer to Peer) connection via a blockchain network 5. As shown in FIGS. 2, 6 and 7, each of the terminals that belongs to the blockchain system 6 includes the blockchain data B and a blockchain control unit for synchronizing the blockchain data B and processing transactions.

In the blockchain data B, control information of content data for distribution in the file management system 9 is registered for each contract that corresponds to the file management system 9. In the example shown in FIG. 1, the blockchain data B includes control information for the first file management system 9a and control information for the second file management system 9b. The control information includes identifiers of right holders and users of content data in the file management system 9, connection information, and the like.

Transactions issued by the blockchain system 6 are verified by terminals that belong to the blockchain system 6 to form the blockchain data B. If the execution of processing is specified in a transaction, the processing is executed by a terminal that belongs to the blockchain system 6, and the blockchain data B is updated.

The file management system 9 is managed by an administrator. The file management system 9 includes the administrator terminal 1, the right holder terminal 2, and the user terminal 3, and may include a plurality of file system control terminals 7. In this embodiment of the present invention, the file management system 9 is a decentralized distributed file management system in which the management of files is distributed among the individual terminals that belong to the file management system 9 such as an IPFS. Each of the terminals that belongs to the file management system 9 establishes a P2P connection via a file management network 8.

In this embodiment of the present invention, the first file management system 9a and the second file management system 9b are used in different operating processes and are controlled in secret from each other.

The administrator terminal 1 is used by an administrator who manages the file management system 9. The administrator terminal 1 connects to the blockchain system 6, the first file management system 9a, and the second file management system 9b. One administrator terminal 1 is defined for one file management system 9, and an administrator who uses one administrator terminal 1 may manage multiple file management systems 9.

The right holder terminal 2 is used by the right holder of a piece of content managed by the file management system 9. The right holder terminal 2 connects to the blockchain system 6, the first file management system 9a, and the second file management system 9b. Multiple right holders may be set for one piece of content, and right holders may be set depending on the content of rights.

The user terminal 3 is used by a user of a piece of content managed by the file management system 9. The user terminal 3 connects to the blockchain system 6, the first file management system 9a, and the second file management system 9b. Multiple users may be set for one piece of content, and users may be set depending on the content of rights.

In this embodiment of the present invention, the file management system 9 is generated by the administrator terminal 1, and the right holder terminal 2 and the user terminal 3 function as participant terminals 10 used by participants who participate in the generated file management system 9, but there is no limitation to this. For example, the administrator terminal 1 may function as the right holder terminal 2 or the user terminal 3 in the content sharing process.

In the example shown in FIG. 1, the number of the blockchain control terminals 4 and the file system control terminals 7 may be any number. The blockchain control terminal 4 and the file system control terminal 7 may be different terminals, or alternatively may be a single terminal with the function of the blockchain control terminal 4 and the function of the file system control terminal 7.

Note that although the case where information on the right holder and the user of a piece of content is registered in the blockchain data B will be described in this embodiment of the present invention, the present invention is not limited to this. For example, information on the right holder and the user of a piece of content may be registered using another distributed ledger instead of the blockchain.

Administrator Terminal

The following describes the administrator terminal 1 according to an embodiment of the present invention with reference to FIG. 2. The administrator terminal 1 includes a storage device 110, a processing device 120, and a communication control device 130. The administrator terminal 1 may be a computer that includes the storage device 110, the processing device 120, and the communication control device 130, or alternatively may be a virtual computer constituted by multiple pieces of hardware. The functions shown in FIG. 2 are realized by such a computer executing a conversion logic generation program.

The storage device 110 is a ROM (Read Only Memory), a RAM (Random Access Memory), a hard disk or the like, and stores various pieces of data such as input data, output data, and intermediate data for the execution of processing by the processing device 120. The processing device 120 is a CPU (Central Processing Unit) that executes processing in the administrator terminal 1 by reading and writing data stored in the storage device 110, and inputting and outputting data to and from the communication control device 130. The communication control device 130 is an interface for the administrator terminal 1 to communicably connect to the right holder terminal 2 and the user terminal 3.

The storage device 110 stores an administrator program, and also stores the blockchain data B, file management control data C, first routing data 111a, and second routing data 111b.

The blockchain data B is blockchain data synchronized among the terminals in the blockchain system 6 shown in FIG. 1. The blockchain data B is updated by the blockchain control unit 121.

In an embodiment of the present invention, the blockchain data B generates the file management system 9 and performs right processing for content managed by the file management system 9 in accordance with Ethereum. The blockchain data B includes blockchain body data Bb and state data Bs. The blockchain body data Bb is formed by connecting blocks in a chain. Each block contains multiple transactions, and in each transaction, a contract may be set, or the execution of a contract may be designated. In the state data Bs, a data area is provided for each contract, and the contract data areas are updated as contracts are executed.

In an embodiment of the present invention, the state data Bs includes a contract that corresponds to the file management system 9. The contract is set with a program that executes processing in the file management system 9 and a data area that is referenced to or updated when the program is executed. The state data Bs has a data structure in which a network identifier that identifies the file management system 9, an identifier of a piece of content managed by the file management system 9 that corresponds to the network identifier, and connection information in the file management system 9 of the right holder terminal 2 used by the right holder of the content are associated with one another. In an embodiment of the present invention, the state data Bs includes a data area that corresponds to the contract of the first file management system 9a and a data area that corresponds to the contract of the second file management system 9b. The data areas for the first file management system 9a and the second file management system 9b are independent each other.

Figure 3:
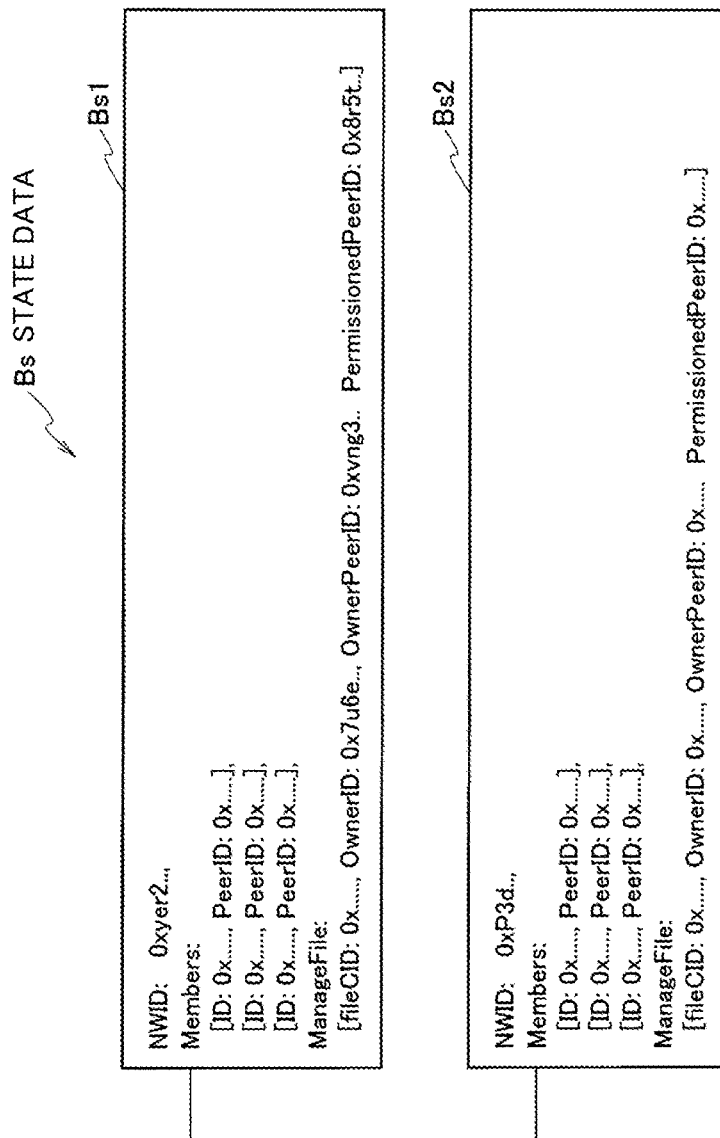
FIG. 3 is a diagram illustrating a data structure of state data according to an embodiment of the present invention, and an example of data.

In an embodiment of the present invention, the state data Bs includes data such as that shown in FIG. 3. The state data Bs includes data Bs1 having items such as participants (Members) and a management file (ManageFile) for each network ID (NWID). Identifiers (IDs) of the participants on the blockchain system 6 and connection information (PeerIDs) on the file management system 9 corresponding to the network ID are stored in association with each other as participant information. The management file holds a file ID (fileCID) managed by the file management system 9, a right holder ID (OwnerID), right holder connection information (OwnerPeerID), user connection information (PermissionedPeerID) and the like in association with one another. Here, the right holder ID is the ID of a right holder in the blockchain system 6. The right holder connection information and the user connection information are pieces of information for connecting to restrictive terminals of the right holder and the user in the file management system 9.

Various pieces of information shown in FIG. 3 may be encrypted by using a common key that is held in common by the administrator terminal 1 and the participant terminal 10 in the file management system 9. By information in each file management system 9 in the state data Bs being encrypted by using a common key for each file management system 9, the data of each file management system 9 can be kept secret from a third party such as a participant in another file management system 9.

Figure 4:
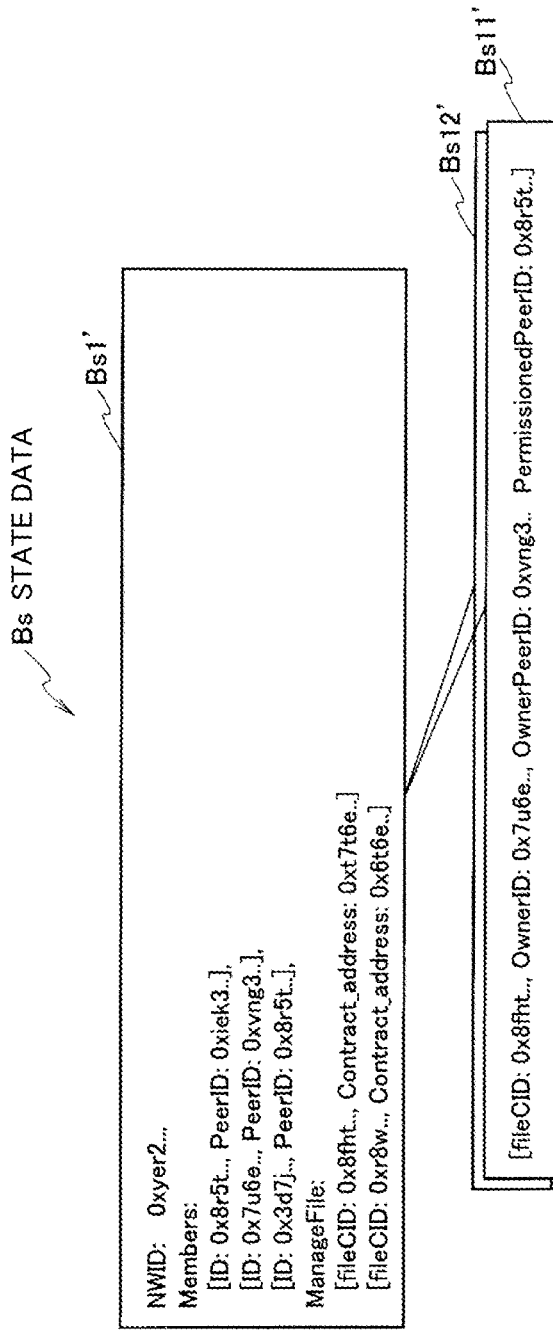
FIG. 4 is a diagram illustrating a data structure of state data according to a variation, and an example of data.

Although FIG. 3 illustrates an example of a case where the state data Bs has, for each file management system 9, a contract for storing information on the participants and the management file of the file management system 9, the present invention is not limited to this. As another example, as shown in FIG. 4, the state data Bs includes a contract Bs1' that stores information on participants in the file management system 9, and a contract Bs11' and a contract Bs12' that respectively store information on the files for each file managed by the contract Bs1'. In the example shown in FIG. 4, more fine control can be performed by providing access restrictions and restricting the range of information leakage for each file, for example. The data structure of the state data Bs shown in FIGS. 3 and 4 is one example, and there is no limitation to this example.

The state data Bs may be in any data format as long as a data area is allocated for each file management system 9, and it is possible to associate information on content managed by a file management system 9 by the network ID that identifies the file management system 9.

The file management control data C is data in which a network identifier that identifies the file management system 9 is associated with an identifier of a contract that is held by the blockchain system 6 and corresponds to the network identifier.

In an embodiment of the present invention, while the administrator terminal 1 can access multiple file management systems 9, the contracts of individual file management systems 9 are independent from each other in the blockchain data B. In view of this, the file management control data C holds the file management systems 9 to which the administrator terminal 1 can connect and the identifiers of the contracts that correspond to the file management systems 9 in association, and accordingly the administrator terminal 1 can connect to multiple file management systems 9 based on the appropriate contracts.

As shown in FIG. 5, the file management control data C may also hold various pieces of data such as a common key, connection information, and other participant connection information in addition to a network ID that identifies a file management system 9, and a contract ID on the blockchain that corresponds to the file management system 9. The common key is used in the file management system 9 and is used to encrypt the connection information and the like of an administrator or a participant. The common key is always held in the administrator terminal 1.

The same connection information may be used as connection information corresponding each network ID. In this case, the connection information may be encrypted and shared with other participant terminals 10 by using a hash value or the like of the common key that corresponds to each network ID as a private key.

The first routing data 111a and the second routing data 111b are pieces of information for specifying holders of files in the first file management system 9a and the second file management system 9b respectively. The first routing data 111a and the second routing data 111b may be simply referred to as routing data 111 if they are not particular distinguished.

The routing data 111 is data in which the identifiers of files in the file management system 9 are associated with the identifiers of terminals that have the files. Each terminal that belongs to the file management system 9 has the routing data 111. The identifiers of files managed in the file management system 9 and the identifiers of terminals that have chunks of the content data are distributed and held by each terminal. By integrating the routing data 111 of each terminal, it is possible to specify the identifiers of all of the chunks of the content data managed in the file management system 9 and the identifiers of the terminals that have the chunks.

The processing device 120 includes a blockchain control unit 121, a file management system generation unit 122, a first file management control unit 123a, and a second file management control unit 123b.

The blockchain control unit 121 gently synchronizes the blockchain data B with the blockchain data possessed by other terminals, thus controlling the blockchain data B to be in the latest state nearly in real time. If multiple transactions are issued, the blockchain data B is updated after verifying whether a block that includes the transactions may be added to the current blockchain body data Bb. Also, when a block is to be added to the blockchain body data Bb, the blockchain control unit 121 executes a contract program and refers to and updates the state data Bs.

The file management system generation unit 122 issues a contract generation transaction for registering information regarding the file management system 9 that is to be generated in the blockchain system 6. The contract generation transaction is processed by the blockchain control terminal 4 or the like that belongs to the blockchain system 6, and the information regarding the file management system 9 that is to be generated is registered in the state data Bs.

The contract generation transaction generates, in the blockchain data B, a contract which is corresponding to a network identifier that identifies the file management system 9 and associates with an identifier of the participant terminal 10 in the blockchain system 6. The contract generation transaction then notifies the participant terminal 10 of the network identifier and the contract identifier.

Here, the file management system generation unit 122 may issue a common key in the file management system 9 that is to be generated. The common key is used to encrypt various pieces of information that are to be registered in the contract.

The file management system generation unit 122 generates the file management control data C after a contract of the file management system 9 that is to be generated is generated in the blockchain system 6. Here, the file management control data C associates a network ID that identifies the file management system 9 with a contract ID, a common key, and the like.

Thereafter, the contract associates an identifier of the participant terminal 10 in the blockchain system 6 with connection information in the file management system 9 for the participant terminal 10, in the state data Bs. The contract also registers, in the state data Bs, an identifier of a right holder of content, which is managed in the blockchain system 6, in the file management system 9 and connection information in the file management system 9, as well as connection information of a user of the content in the file management system 9.

Also, by the contract, identifiers of participants in the blockchain system 6 are associated in the state data Bs. As a result, the blockchain system 6 can reject a request for reference or update of the contract from a third party that is not a participant.

The first file management control unit 123a establishes a P2P connection with a terminal that belongs to the first file management system 9a, and the second file management control unit 123b establishes a P2P connection with a terminal that belongs to the first file management system 9a. The first file management control unit 123a and the second file management control unit 123b may be simply described as the file management control unit 123 when they are not particularly distinguish.

When information of a file management system 9 that is to be generated is registered in the blockchain data B by the file management system 9, the file management control unit 123 is formed as an instance that corresponds to the generated file management system 9. An instance of the file management control unit 123 is generated for each network identifier.

The file management control unit 123 issues a registration transaction for registering connection information in the file management system 9 for the administrator terminal 1 in a contract in the blockchain system 6. Accordingly, the participant terminal 10 of the file management system 9 can establish a P2P connection with the administrator terminal 1. Also, the connection information of the administrator terminal 1 registered here may be encrypted with a predetermined common key.

Also, the file management control unit 123 acquires connection information in the file management system 9 for the participant terminal 10 from the contract, and establishes a P2P connection with the participant terminal 10 based on the acquired connection information. The file management control unit 123 registers content in the file management system 9 and manages the routing data 111 held by the administrator terminal 1 via the P2P connection.

Right Holder Terminal

The following describes the right holder terminal 2 according to an embodiment of the present invention with reference to FIG. 6. The right holder terminal 2 includes a storage device 210, a processing device 220, and a communication control device 230. The storage device 210, the processing device 220, and the communication control device 230 are similar to the storage device 110, the processing device 120, and the communication control device 130 of the administrator terminal 1 described with reference to FIG. 2.

The storage device 210 stores a right holder program and a participant program, and also stores the blockchain data B, the file management control data C, the first routing data 211a, the second routing data 211b, and content management data 212.

The blockchain data B is similar to the blockchain data B of the administrator terminal 1 described with reference to FIG. 2.

The file management control data C is similar to the file management control data C of the administrator terminal 1 described with reference to FIG. 2. Note that although the common key is always held in the administrator terminal 1, the right holder terminal 2 is not required to always hold the common key, and the common key may be acquired from the administrator terminal 1 as necessary.

The first routing data 211a and the second routing data 211b are also similar to the first routing data 111a and the second routing data 111b of the administrator terminal 1, but different data may be held in some cases.

The content management data 212 is data for managing the content data registered in the file management system 9. The content management data 212 associates an identifier of a piece of content, a network ID of a file management system 9 in which the content is registered, and identifiers of chunks that constitute the content. The content management data 212 may hold a table in which a content ID is associated with chunk IDs so that the content can be immediately identified in response to a chunk acquisition request.

The processing device 220 includes a blockchain control unit 221, a first file management control unit 222a, a second file management control unit 222b, a registration unit 223, and a user registration unit 224.

The blockchain control unit 221 is similar to the blockchain control unit 121 of the administrator terminal 1 described with reference to FIG. 2.

The first file management control unit 222a establishes a P2P connection with a terminal that belongs to the first file management system 9a, and the second file management control unit 222b establishes a P2P connection with a terminal that belongs to the second file management system 9b. The first file management control unit 222a and the second file management control unit 222b may be simply described as the file management control unit 222 when they are not particularly distinguish.

After the file management system 9 is generated, the file management control unit 222 is notified by the blockchain system 6 of the identifier of the contract that corresponds to the network identifier that identifies the file management system 9. The file management control unit 222 issues a registration transaction for registering connection information in the file management system 9 for the right holder terminal 2 (participant terminal 10) in the contract that corresponds to the notified contract identifier. At this time, the connection information may be encrypted with the common key corresponding to the file management system 9 that was notified from the blockchain system 6.

The file management control unit 222 further acquires connection information of the administrator terminal 1 from the contract that corresponds to the notified contract identifier, and establishes a P2P connection with the administrator terminal 1 based on the acquired connection information. The file management control unit 222 similarly establishes a P2P connection with another participant terminal 10.

The file management control unit 222 registers content in the file management system 9 and manages routing data 211 held by the right holder terminal 2 via the P2P connection.

The file management control unit 222 further registers the fact that the right holder terminal 2 has the content in the contract of the blockchain system 6, and then gives a notification that the right holder terminal 2 has the content via the file management system 9 in which the content is managed. After receiving a content acquisition request from a user terminal 3 via the file management system 9 in which the content is managed, the file management control unit 222 transmits the content to the user terminal 3 via the file management system 9. At this time, if the connection information of the user terminal 3 is associated with the content identifier in the contract that corresponds to the file management system 9, the file management control unit 222 transmits the content to the user terminal 3 via the file management system 9.

The registration unit 223 issues a right holder registration transaction for registering the right holder of content in the contract that corresponds to the file management system 9 in which the content is to be registered. The right holder registration transaction is for registering, in a contract that corresponds to the network identifier of the file management system 9, a content identifier in the file management system 9 in which the content is to be registered, and connection information in the file management system 9 for a right holder terminal 2. Here, the connection information in the file management system 9 for the right holder terminal 2 may be encrypted with the common key of the file management system 9. According, the fact that new content was registered in the file management system 9, and the right holder of the content, can be notified to other terminals via the blockchain system 6.

Here, in the right holder registration transaction, the registration unit 223 may further register, in the contract, an identifier of the right holder in the blockchain system in association with the content identifier. As a result, when the right holder terminal 2 issues a transaction for registering a user of the content, the user can be registered by confirming that the transaction is from a legitimate right holder of the content in the contract.

The user registration unit 224 issues a user registration transaction for registering a user of the content in the contract. The user registration unit 224 registers the user of the content after the right holder of the content has been registered by the registration unit 223. The user registration transaction associates connection information in the file management system for the user terminal 3 that is to use the content with the content identifier in the contract that corresponds to the network identifier of the file management system 9 that manages the content. Here, the connection information in the file management system 9 for the user terminal 3 may be encrypted with the common key of the file management system 9. According, the fact that a user was set for content in the file management system 9, and information on the content user can be notified to other terminals via the blockchain system 6.

User Terminal

The following describes the user terminal 3 according to an embodiment of the present invention with reference to FIG. 7. The user terminal 3 includes a storage device 310, a processing device 320, and a communication control device 330. The storage device 310, the processing device 320, and the communication control device 330 are similar to the storage device 110, the processing device 120, and the communication control device 130 of the administrator terminal 1 described with reference to FIG. 2.

The storage device 310 stores a user program and a participant program, and also stores the blockchain data B, the file management control data C, the first routing data 211a, and the second routing data 211b.

The blockchain data B is similar to the blockchain data B of the administrator terminal 1 described with reference to FIG. 2.

The file management control data C is similar to the file management control data C of the administrator terminal 1 described with reference to FIG. 2. Note that although the common key is always held in the administrator terminal 1, the user terminal 3 is not required to always hold the common key, and the common key may be acquired from the administrator terminal 1 as necessary.

The first routing data 311*a* and the second routing data 311*b* are also similar to the first routing data 111*a* and the second routing data 111*b* of the administrator terminal 1, but different data may be held.

If the user terminal 3 holds data as a user of content, it may hold data similar to that of the content management data 212 of the right holder terminal 2 described with reference to FIG. 6.

The processing device 320 includes a blockchain control unit 321, a first file management control unit 322*a*, and a second file management control unit 322*b*.

The blockchain control unit 321 is similar to the blockchain control unit 121 of the administrator terminal 1 described with reference to FIG. 2.

The first file management control unit 322*a* establishes a P2P connection with a terminal that belongs to the first file management system 9*a*, and the second file management control unit 322*b* establishes a P2P connection with a terminal that belongs to the second file management system 9*b*. The first file management control unit 322*a* and the second file management control unit 322*b* may be simply described as the file management control unit 322 when they are not particularly distinguish.

After the file management system 9 is generated, the file management control unit 322 is notified by the blockchain system 6 of the identifier of the contract that corresponds to the network identifier that identifies the file management system 9. The file management control unit 322 issues a registration transaction for registering connection information in the file management system 9 for the user terminal 3 (participant terminal 10) in the contract that corresponds to the notified contract identifier. At this time, the connection information may be encrypted with the common key corresponding to the file management system 9 that is notified from the blockchain system 6.

The file management control unit 322 further acquires connection information of the administrator terminal 1 from the contract that corresponds to the notified contract identifier, and establishes a P2P connection with the administrator terminal 1 based on the acquired connection information. The file management control unit 322 similarly establishes a P2P connection with another participant terminal 10.

The file management control unit 322 registers content in the file management system 9 and manages routing data 211 held by the user terminal 3 via the P2P connection. For example, after the file management control unit 322 is notified that the right holder terminal 2 has content via the file management system 9, the file management control unit 322 holds routing data to be held by the user terminal 3 regarding the content.

Further, when the user terminal 3 is to use content, the file management control unit 322 acquires connection information of the right holder terminal 2 from the contract that corresponds to the network identifier of the file management system 9 that manages the content, and requests the content from the right holder terminal 2 via the file management system 9.

The file management control unit 322 notifies the right holder terminal 2 that the user terminal 3 desires to use the content via the blockchain system 6. At this time, if payment of a price is a condition, a sharing unit 324 pays the price according to the condition. If sharing of the content with the user terminal 3 is permitted, the right holder terminal 2 issues a user setting transaction for registering the connection information of the user terminal 3 associated with the identifier of the content that is to be used in the contract of the blockchain system 6. At this time, the connection information of the user terminal 3 is registered in the contract that corresponds to the network ID of the file management system 9 in which the content to be used is managed.

File Management System Generation

Figure 8:
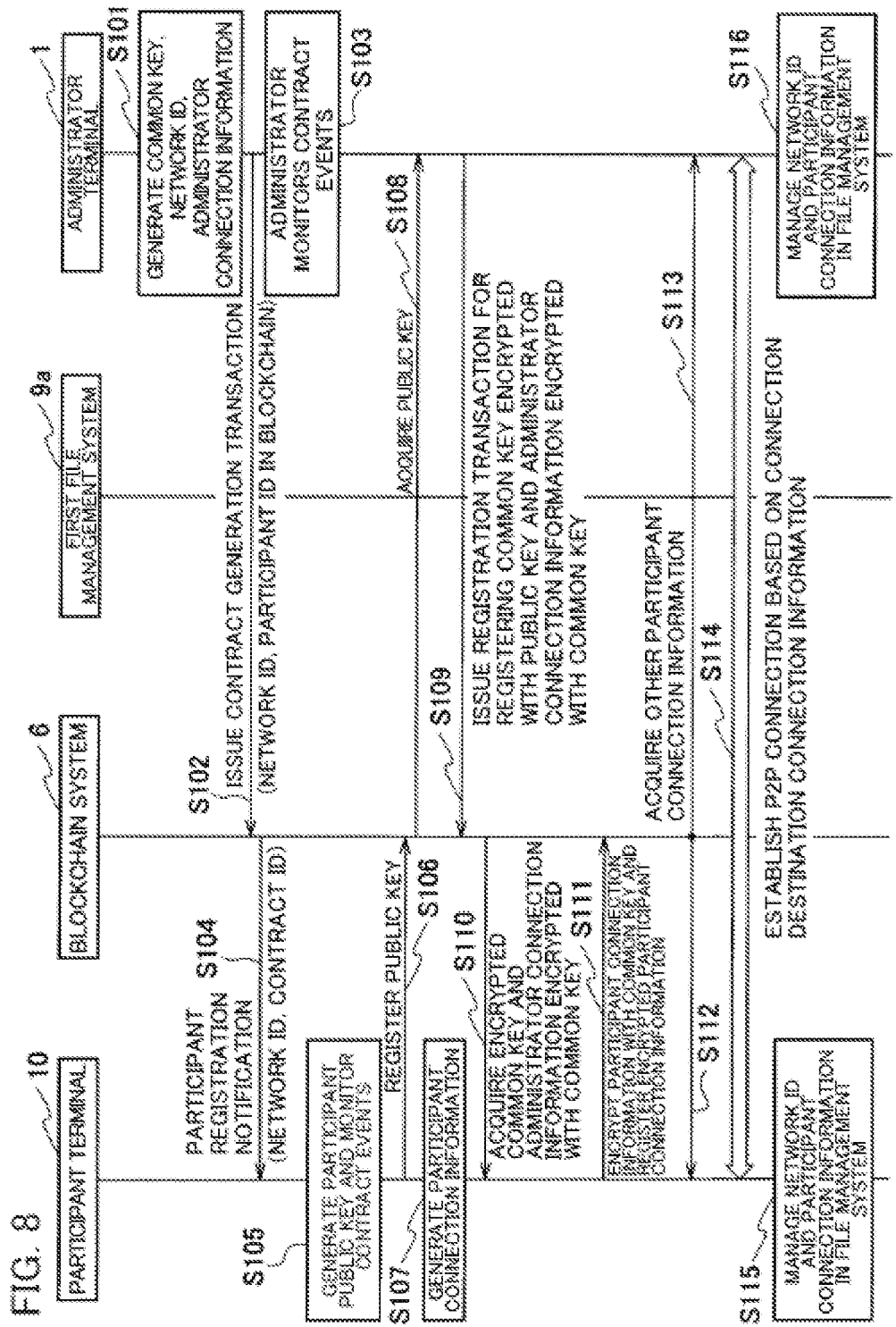
FIG. 8 is a sequence diagram illustrating processing for generating a file management system in an embodiment of the present invention.

The following describes processing for generating the first file management system 9*a* with reference to FIG. 8.

In step S101, when the first file management system 9*a* is to be generated, the administrator terminal 1 generates a common key that corresponds to the first file management system 9*a* and a network ID that identifies the first file management system 9*a*. The administrator terminal 1 also generates administrator connection information in the first file management system 9*a*.

In step S102, the administrator terminal 1 transmits, to the blockchain system 6, a contract generation transaction for generating a contract regarding the first file management system 9*a* that is to be generated. The contract generation transaction includes the network ID of the first file management system 9*a* and the ID of a participant that is to participate in the first file management system 9*a* on the blockchain system 6.

In step S103, the administrator terminal 1 starts monitoring events related to the contract that was generated in step S102.

In step S104, based on a participant ID included in the contract generation transaction, the blockchain system 6 notifies a participant terminal 10 that participant registration was performed. This notification includes the network ID of the first file management system 9*a* in which participant registration was performed and a contract ID that includes information regarding the first file management system 9*a*.

In step S105, the participant terminal 10 generates a public key in order to acquire the common key held by the administrator terminal 1, and starts monitoring events related to the contract that was generated in step S102.

In step S106, the participant terminal 10 registers the public key generated in step S105 in the blockchain data B of the blockchain system 6. In step S107, the participant terminal 10 generates connection information for the participant in the first file management system 9*a*. In step S108, the administrator terminal 1 acquires the public key that was registered in step S106.

In step S109, the administrator terminal 1 registers, in the blockchain data B, the common key that was encrypted with the public key acquired in step S108 and the administrator connection information in the first file management system 9*a* that was generated in step S101. The administrator connection information is encrypted with the common key.

In step S110, the participant terminal 10 acquires the encrypted common key from the blockchain data B and the administrator connection information that was encrypted with the common key. In step S111, the participant terminal 10 encrypts the participant connection information that was generated in step S107 with the common key and registers the encrypted participant connection information in the blockchain data B.

In step S112, the participant terminal 10 acquires other participant connection information from the blockchain data B. In step S113, the administrator terminal 1 acquires other participant connection information from the blockchain data B. In step S114, the participant terminal 10 and the administrator terminal 1 establish a P2P connection based on connection destination connection information. A P2P connection is also established with other participants.

In step S115, the participant terminal 10 manages the network ID, the connection information of participants in the first file management system 9a and the like in the file management control data C. Similarly, in step S116, the administrator terminal 1 manages the network ID, the connection information of participants in the first file management system 9a and the like in the file management control data C.

Right Holder Registration

Figure 9:
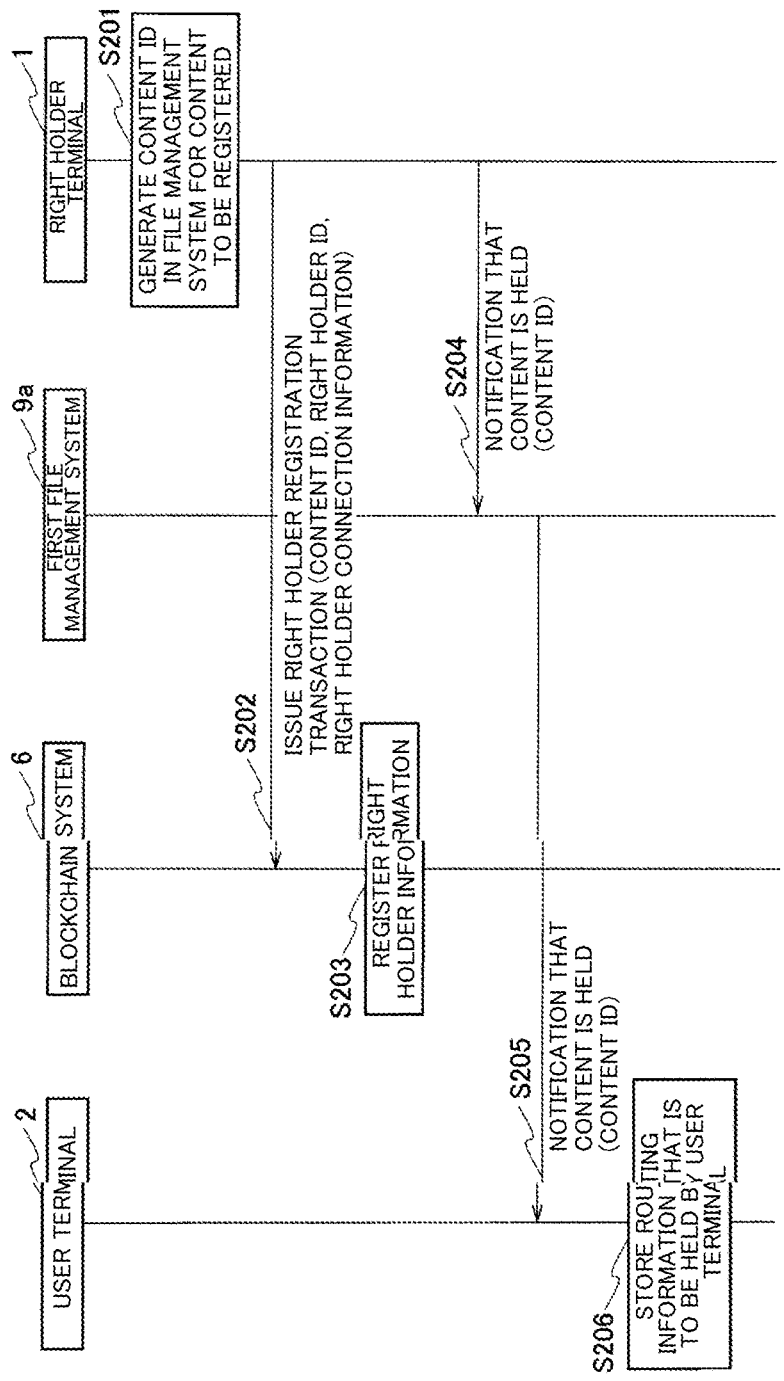
FIG. 9 is a sequence diagram illustrating right holder registration processing in an embodiment of the present invention.

The following describes processing for registering content in the first file management system 9a and registering a right holder of such content in the blockchain data B with reference to FIG. 9.

In step S201, the right holder terminal 2 generates a content ID in the first file management system 9a for content that is to be registered in the first file management system 9a. In step S202, the right holder terminal 2 issues a right holder registration transaction for registering the content ID generated in step S201, a right holder ID in the blockchain system 6, and right holder connection information in the first file management system 9a. In step S203, various pieces of information on the right holder is registered in a contract that corresponds to the first file management system 9a based on the right holder registration transaction.

In step S204, the right holder terminal 2 notifies the first file management system 9a that content is held, along with a content ID. In step S205, the user terminal 3 is also notified that the right holder terminal 2 holds the content, along with the content ID. In step S206, the user terminal 3 stores routing information that is to be held by the user terminal 3.

User Registration

The following describes processing for registering a user of content that was registered in the first file management system 9a in the blockchain data B, and sharing the content with the user terminal 3 with reference to FIG. 10.

In step S301, the right holder terminal 2 issues a user setting transaction for setting a content user in the blockchain data B. The right holder terminal 2 refers to the file management control data C, specifies the contract ID that corresponds to the network ID of the first file management system 9a, and transmits a user setting transaction to the specified contract ID. The user setting transaction includes the content ID, the ID of the right holder in the blockchain system 6, and user connection information that has been encrypted with a common key.

In step S302, the blockchain system 6 determines whether the user setting transaction that was transmitted in step S301 was issued by a legitimate right holder. Specifically, the blockchain system 6 determines whether the ID of the right holder of the content ID in the contract that corresponds to the network ID of the first file management system 9a matches the right holder ID that was received in step S301. If the IDs match, it is determined that the transaction was issued by a legitimate right holder, and in step S303, the blockchain system 6 registers the user connection information that was transmitted in step S301 in the contract that corresponds to the first file management system 9a.

In step S304, the user terminal 3 is notified that user registration was performed. This notification includes the network ID of the first file management system 9a that manages the content for which user registration was performed, and the content ID.

In step S305, the user terminal 3 refers to the file management control data C and specifies the contract ID that corresponds to the network ID of the first file management system 9a that was received in step S304. The user terminal 3 then designates a content ID for the contract that has the specified contract ID in the blockchain system 6, and makes an inquiry regarding connection information of the content right holder in the first file management system 9a. In step S306, the user terminal 3 acquires right holder connection information that was encrypted with the common key. If the user terminal 3 does not hold the common key, the user terminal 3 may issue a public key and acquire the common key that has been encrypted with the public key as described with reference to FIG. 8.

In step S307, the user terminal 3 transmits a content acquisition request via the first file management system 9a based on the right holder connection information that was acquired in step S306. The chunk IDs that make up the content are specified in this request. In step S308, the content acquisition request that was transmitted from the user terminal 3 is transmitted to the right holder terminal 2.

In step S309, the right holder terminal 2 specifies the content ID from the chunk IDs that are designated in the content acquisition request. In step S310, the right holder terminal 2 makes a user inquiry to the contract that corresponds to the first file management system 9a. This inquiry includes the requested content ID.

If the user is confirmed in step S311, the right holder terminal 2 transmits the content via the first file management system 9a in step S312. In step S313, the user terminal 3 receives the content.

As described above, in accordance with the content use system 100 according to an embodiment of the present invention, in the blockchain system 6, a different contract is generated for each file management system 9, and information on content managed by the file management systems 9 is held in a data area that corresponds to each contract in the state data Bs. As a result, the blockchain system 6 can manage information for multiple file management systems 9. Further, by holding participant information for each file management system 9, the content use system 100 can perform control such that contract information is not leaked to anyone other than the participants. As a result, the content use system 100 can establish a file management system 9 for each operating process and ensure the confidentiality between operating processes.

Other Embodiments

Although an embodiment of the invention has been described, the descriptions and drawing ss that form part of this disclosure does not intend to limit the present invention. Various alternative embodiments, examples, and operational techniques will be apparent to those skilled in the art from this disclosure.

For example, each terminal such as the administrator terminal described in an embodiment of the present invention may be configured in one piece of hardware as shown in FIG. 2, or alternatively may be configured in multiple pieces of hardware depending on the functionality and the number of processing.

It goes without saying that the present invention includes various embodiments not described herein. Accordingly, the technical scope of the present invention is defined only by the matter specifying the invention according to the claims, as reasonable from the above description.

Reference Signs List 1 Administrator terminal
2 Right holder terminal
3 User terminal
4 Blockchain control terminal
5 Blockchain network
6 Blockchain system
7 File system control terminal
8 File management network
9 File management system
10 Participant terminal
100 Content use system
110, 210, 310 Storage device
111 Routing data
120, 220, 320 Processing device
121 Blockchain control unit
122 File management system generation unit
123, 222, 322 File management control unit
130, 230, 330 Communication control device
212 Content management data
223 Registration unit
224 User registration unit
B Blockchain data
Bb Blockchain body data
Bs State data
C File management control data

The invention claimed is:

1. A right holder terminal used for a content use system that includes a file management system, a distributed ledger system including a distributed ledger, and the right holder terminal used by a right holder of a content piece, the right holder terminal comprising:
 a storage device configured to store file management control data in which a network identifier that identifies the file management system is associated with an identifier of a contract that is held in the distributed ledger system and corresponds to the network identifier;
 a registration unit, comprising one or more processors, configured to issue a right holder registration transaction for registering the network identifier of the file management system in which a content piece is to be registered, an identifier of the content piece in the file management system, and connection information of the right holder terminal in the file management system, in the contract that corresponds to the network identifier; and
 a file management control unit, comprising one or more processors, configured to give a notification that the right holder terminal has the content piece via the file management system.

2. A user terminal used for a content use system that includes a file management system, a distributed ledger system including a distributed ledger, a right holder terminal used by a right holder of a content piece, and the user terminal used by a user of the content piece, the user terminal comprising:
 a storage device configured to store file management control data in which a network identifier that identifies the file management system is associated with an identifier of a contract that is held in the distributed ledger system and corresponds to the network identifier; and
 a file management control unit, comprising one or more processors, configured to hold routing data that is to be held by the user terminal in response to being notified that the right holder terminal has the content piece via the file management system.

3. A non-transitory, computer-readable medium storing one or more instructions executable by a computer to perform operations as the right holder terminal according to claim 1.

4. A non-transitory, computer-readable medium storing one or more instructions executable by a computer to perform operations as the user terminal according to claim 2.

5. A non-transitory, computer-readable medium storing instructions that, upon execution, cause one or more computers to provide a data structure of state data used for a content use system that includes a plurality of file management systems and a distributed ledger system including a distributed ledger that holds information regarding right holders of content pieces managed by the file management systems, the state data being state data that corresponds to a contract that corresponds to the file management systems, and the state data associating network identifiers that identify the file management systems, identifiers of content pieces managed by the file management systems that correspond to the network identifiers, and connection information of a right holder terminal used by a right holder of a content piece in the file management system, and
 the right holder terminal being configured to issue a right holder registration transaction for registering an identifier of the content piece in the file management system in which the content piece is to be registered and connection information of the right holder terminal in the file management system, in a contract that corresponds to the network identifier of the file management system.

* * * * *